(12) United States Patent
Nefedov et al.

(10) Patent No.: US 9,742,555 B2
(45) Date of Patent: Aug. 22, 2017

(54) ENCRYPTION/IDENTIFICATION USING ARRAY OF RESONATORS AT TRANSMITTER AND RECEIVER

(75) Inventors: Nikolai Nefedov, Thalwil (CH); Mikko A. Uusitalo, Helsinki (FI); Markku A. Oksanen, Helsinki (FI); Valtteri Niemi, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 1799 days.

(21) Appl. No.: 12/284,927

(22) Filed: Sep. 25, 2008

(65) Prior Publication Data

US 2010/0074445 A1    Mar. 25, 2010

(51) Int. Cl.
| | |
|---|---|
| H04L 9/28 | (2006.01) |
| H04L 9/14 | (2006.01) |
| H04L 9/00 | (2006.01) |
| H04L 9/08 | (2006.01) |
| H04L 9/12 | (2006.01) |

(52) U.S. Cl.
CPC ............ *H04L 9/001* (2013.01); *H04L 9/0838* (2013.01); *H04L 9/12* (2013.01); *H04L 2209/12* (2013.01); *H04L 2209/80* (2013.01)

(58) Field of Classification Search
CPC .......... H04L 9/001; H04L 9/12; H04L 9/0838
USPC ........ 378/130, 134–136, 142–143, 149–150; 331/2, 46, 78, 154, 116 M; 380/43, 380/252–253, 262–263, 265, 268
See application file for complete search history.

(56) References Cited

U.S. PATENT DOCUMENTS

| | | | | |
|---|---|---|---|---|
| 4,037,159 A | * | 7/1977 | Martin | H04K 3/25 333/150 |
| 5,007,087 A | * | 4/1991 | Bernstein et al. | 380/46 |
| 5,131,038 A | * | 7/1992 | Puhl et al. | 340/5.61 |
| 5,291,555 A | * | 3/1994 | Cuomo | H04K 1/025 331/78 |

(Continued)

FOREIGN PATENT DOCUMENTS

| | | | | |
|---|---|---|---|---|
| WO | WO 94/14260 | * | 6/1994 | H04L 9/00 |

OTHER PUBLICATIONS

Tepin V P: "Self-parametric chaotic oscillators for secure communication systems" Circuits and Systems for Communications, 2002. Proceedings. ICCSC 02.1sr IEEE International Conference on Jun. 26-28, 2002. Pa~es 271-274, XP010600433, ISBN: 978-5-7422-0260-8.*

(Continued)

*Primary Examiner* — Christopher Revak
(74) *Attorney, Agent, or Firm* — Harrington & Smith (57) ABSTRACT

A sender and a receiver includes first and second arrays of coupled oscillators, respectively, that are substantially identically constructed so as to exhibit substantially the same dynamical response to excitation. A chaotic waveform generated at the sender is transmitted to the receiver, which generates a second chaotic waveform, and compares the received waveform with the generated second waveform. If the first and second waveforms match the sender is an authorized sender. An integrated circuit includes an array of coupled oscillators that in combination generate a waveform in response to at least one excitation signal. The array of coupled oscillators represents, in response to application of the excitation signals, a multi-dimensional security key that is shared between the sender of the waveform and the receiver of the waveform.

41 Claims, 8 Drawing Sheets

(56) References Cited

U.S. PATENT DOCUMENTS

| | | | | |
|---|---|---|---|---|
| 5,523,746 A * | 6/1996 | Gallagher | | 340/5.61 |
| 5,706,192 A * | 1/1998 | Schwartz et al. | | 700/28 |
| 5,724,028 A * | 3/1998 | Prokup | | 701/36 |
| 5,794,130 A * | 8/1998 | Abe et al. | | 455/76 |
| 5,848,160 A * | 12/1998 | Cai | | H04B 1/707 |
| | | | | 375/E1.002 |
| 5,914,553 A * | 6/1999 | Adams et al. | | 310/309 |
| 6,018,717 A * | 1/2000 | Lee et al. | | 705/13 |
| 6,289,324 B1* | 9/2001 | Kawan | | 705/41 |
| 6,310,523 B1* | 10/2001 | Chen et al. | | 331/57 |
| 6,631,471 B1* | 10/2003 | Ohki | | G06F 21/558 |
| | | | | 380/277 |
| 6,876,692 B2* | 4/2005 | Shi et al. | | 375/141 |
| 6,922,432 B2* | 7/2005 | Callaway et al. | | 375/141 |
| 6,980,657 B1* | 12/2005 | Hinton, Sr. | | H04L 27/001 |
| | | | | 375/285 |
| 7,072,469 B1* | 7/2006 | Oudaltsov | | H04L 9/001 |
| | | | | 380/263 |
| 7,098,144 B2* | 8/2006 | Zhang et al. | | 438/734 |
| 7,172,112 B2* | 2/2007 | Bonalle et al. | | 235/379 |
| 7,206,847 B1* | 4/2007 | Alberth et al. | | 709/229 |
| 7,228,155 B2* | 6/2007 | Saunders | | 455/558 |
| 7,233,212 B2* | 6/2007 | Boerstler et al. | | 331/78 |
| 7,255,745 B2* | 8/2007 | Zhang et al. | | 117/94 |
| 7,306,158 B2* | 12/2007 | Berardi et al. | | 235/492 |
| 7,376,839 B2* | 5/2008 | Carta et al. | | 713/185 |
| 2002/0176574 A1* | 11/2002 | Sherman | | H04L 9/0662 |
| | | | | 380/46 |
| 2003/0177374 A1* | 9/2003 | Yung et al. | | 713/189 |
| 2004/0078421 A1* | 4/2004 | Routt | | 709/201 |
| 2005/0093868 A1* | 5/2005 | Hinckley | | 345/502 |
| 2005/0268096 A1* | 12/2005 | Kilian-Kehr et al. | | 713/168 |
| 2006/0010079 A1* | 1/2006 | Brickell | | 705/67 |
| 2006/0069706 A1* | 3/2006 | Lazich et al. | | 708/251 |
| 2006/0119913 A1* | 6/2006 | Moon | | 359/2 |
| 2006/0248340 A1* | 11/2006 | Lee et al. | | 713/181 |
| 2007/0096847 A1* | 5/2007 | Trutna, Jr. | | H03H 9/462 |
| | | | | 333/133 |
| 2007/0192911 A1* | 8/2007 | Xin et al. | | 977/876 |
| 2009/0169018 A1* | 7/2009 | Deisher | | 380/278 |
| 2014/0176203 A1* | 6/2014 | Matheny | | H03B 5/30 |
| | | | | 327/146 |
| 2016/0352515 A1* | 12/2016 | Bunandar | | H04L 9/0852 |

OTHER PUBLICATIONS

Jorg Schweizer et al.; "Multiple Access Communications Using Chaotic Signals", 1996, Swiss Federal Institute of Technology, IEEE, pp. 108-111.*
"VLSI Cellular Array of Coupled Delta-Sigma Modulators for Random Analog Vector Generation", Gert Cauwenberhs, IEEE 1998, pp. 1151-1155.
"Chaotic Circuits and Encryption", Brad Aimone et al., Jun. 16, 2006, 12 pgs.
"Discrete-Time Chaotic Encryption Systems Part II: Realisations and Performance Analysis", Thomas Falk et al., 1996, 10 pgs.
"Discrete-Time Chaotic Encryption Systems—Part III: Cryptographical Analysis", Dachselt et al., IEEE 1998, pp. 983-988.
Tepin V P: "Self-parametric chaotic oscillators for secure communication systems" Circuits and Systems for Communications, 2002. Proceedings. ICCSC 02. 1$^{st}$ IEEE International Conference on Jun. 26-28, 2002. pp. 271-274, XP010600433, ISBN: 978-5-7422-0260-8.
"The Kuramoto model: A simple paradigm for synchroization phenomena", Juan A. Acebrpm et al., Reviews of Modern Physics, vol. 77, Jan. 2005, pp. 137-185.
"Self-Entrainment of a Population of Coupled Non-Linear Oscillators", Yoshiki Kuramoto, Kyushu University, Department of Physics, Fukuoka, Japan, pp. 420-422.
"Multiple Access Communications Using Chaotic Signals", Jorg Schweizer et al., IEEE 1996, pp. 108-111.
"A tunable carbon nanotube electromechanical oscillator", Vera Sazonova et al., Nature Publishing Group, 2004, pp. 284-287.

* cited by examiner

ENCRYPTION/IDENTIFICATION USING ARRAY OF RESONATORS AT TRANSMITTER AND RECEIVER

TECHNICAL FIELD

The exemplary and non-limiting embodiments of this invention relate generally to communication systems, methods, devices and computer programs and, more specifically, relate to encryption/decryption, identification and secure communication methods, apparatus and computer programs.

BACKGROUND

Various abbreviations that appear below are defined as follows:
CNT carbon nanotube
MEMS micro-electromechanical system
NEMS nano-electromechanical system
PIN personal identification number
RF radio frequency
RSA Rivest, Shamir, and Adelman (a cryptographic algorithm)

Information sent over non-secure connections may allow third parties to intercept, read, copy and use the information for unauthorized purposes. In many cases there is a need to encrypt the information to prevent unauthorized access to sensitive information and to possibly modify the sensitive information. A closely related problem relates to the identification of a sender to control access to some physical or virtual location or information.

As techniques for sender identification and encryption of information are developing, so are also techniques to defeat the identification and encryption. There is a continuous need to develop new and better methods to securely transmit information from one location to another.

Many encryption mechanisms in use (e.g., RSA Secure ID) are based on a secret algorithm and a key that is composed of a code, such as a PIN code, and the time of day and date. These mechanisms together are used to verify that both ends of the link have the same information to form a trusted pair. In case of wireless communications the information encrypted in this way is mapped on a physical carrier and decrypted after demodulation at receiver. However, the secret algorithm may be copied, resulting in its unauthorized use.

Examples of identification in wireless systems may follow the following rules:
a sender transmits frequency masks as an identification key (possibly arranged in a certain prescribed sequence, e.g., cyclically rotated);
a receiver calculates a correlation of a received signal with a locally generated frequency masks (arranged in a certain prescribed sequence); and
an identification/decryption event takes place if a maximum of the correlation function is greater than some certain threshold.

While basically secure, this procedure is also subject to attack by third parties.

In U.S. Pat. No. 5,914,553, "Multistable Tunable Micromechanical Resonators", Adam et al. describe the use of steady-state chaotic oscillation in a tunable MEM oscillator to provide a mechanism for producing a secure communication system by filtering an information signal through a chaotic MEMS system. An input signal can be encrypted in a first MEMS device, transmitted to a matched MEMS receiver, and decrypted. This is said to be accomplished by fabricating a pair of MEMS oscillators on the same substrate, or wafer, so that they will have very similar, although not necessarily identical, parameters. Even when separated, it is said that they will be sufficiently similar that secure communication between them can be achieved, because of their common origin, by using one oscillator as a filter to produce a noise-like, unintelligible signal, and using the other to recover the information signal through an inverse filter. The result is said to be a symmetrical encryption system whose keys are the chaotic system parameters and the dynamic initial conditions of the system.

While U.S. Pat. No. 5,914,553 suggests the use of tunable MEMS, the secure data communications with a chaotic waveform as described in U.S. Pat. No. 5,914,553 is not practical, since it requires the perfect synchronization between the received chaotic waveform (delayed due to propagation conditions) and a locally generated waveform. In practice any synchronization error due to properties of chaotic signals creates a mismatch that exponentially increases in time between the received waveforms and locally generated waveforms. This mismatch will, after some period of time, destroy a match between the transmitted data and the received data. Furthermore, even with synchronization in place, the secure communications with one chaotic waveform as in U.S. Pat. No. 5,914,553 may be maintained only over a rather limited time period defined by the accuracy of the synchronization.

The use of chaotic dynamics in encryption systems is also described in "Chaotic Circuits and Encryption", Jun. 16, 2006, where Aimone et al. discuss an ability to synchronize chaotic circuits as being useful to encrypt signals along a communication channel. In this technique a sender encrypts an information signal using a chaotic carrier such that, if the transmission is intercepted, it is chaotic and undecipherable. A receiver removes the chaotic signal from the transmitted signal to obtain the information signal. Ideally, it is said, without the chaotic parameters and equations (e.g., initial conditions), chaos cannot be separated from the signal.

It is known to use arrays of devices to generate random analog vectors with controlled statistics from deterministic chaos. For example, in "VLSI Cellular Array of Coupled Delta-Sigma Modulators for Random Analog Vector Generation", G. Cauwenberghs (1998 IEEE) reports that cellular arrays of cascaded delta-sigma modulators were used for the purpose of random analog vector generation. In this system the particular form of non-linear coupling between cells is said to not only avoid correlation across cells, but to also produce a truly random sequence in the sense that the outcome of a cell at a given time is statistically independent of its history. The interactions between cells are said to be nearest-neighbor interactions.

SUMMARY

The foregoing and other problems are overcome, and other advantages are realized, by the use of the exemplary embodiments of this invention.

In a first aspect thereof the exemplary embodiments of this invention provide a method that comprises exciting at least some individual ones of a plurality of oscillators of an array of coupled oscillators with a signal comprising first information that comprises a first key known to a sender and to a receiver, said array of coupled oscillators representing second information that comprises a second key known to the sender and to the receiver; generating a waveform that comprises signals output from the at least some individual ones of the coupled oscillators; and sending the waveform from the sender to the receiver.

In another aspect thereof the exemplary embodiments of this invention provide an integrated circuit that comprises an array of coupled oscillators that in combination are configured to generate a waveform in response to at least one excitation signal. The array of coupled oscillators represents, in response to application of the at least one excitation signal, a multi-dimensional security key that is shared between a sender of the waveform and a receiver of the waveform.

In another aspect thereof the exemplary embodiments of this invention provide a method that comprises receiving, at a receiver, a waveform from a sender; exciting at least some individual ones of a plurality of oscillators of an array of coupled oscillators with at least one signal comprising first information that comprises a first key known to the sender and to the receiver, where the array of coupled oscillators represents second information that comprises a second key known to the sender and to the receiver; generating a waveform that comprises signals output from the at least some individual ones of the coupled oscillators; and comparing the generated waveform to the received waveform.

In another aspect thereof the exemplary embodiments of this invention provide an apparatus that comprises means for generating a time evolution of frequencies output from at least some of a plurality of globally coupled oscillators; means for exciting at least some individual ones of the plurality of oscillators with a signal comprising first information that comprises a first key known to a sender and to a receiver, where the generating means represents second information that comprises a second key known to the sender and to the receiver; means for outputting a waveform that comprises frequency signals from at least some individual ones of the plurality of oscillators, the generated waveform exhibiting chaotic behavior; and means for sending the waveform from the sender to the receiver.

In a still further aspect thereof the exemplary embodiments of this invention provide an apparatus that comprises means for receiving a waveform from a sender at a receiver; means for generating a time evolution of frequencies output from at least some of a plurality of globally coupled oscillators; means for exciting at least some individual ones of the plurality of oscillators with a signal comprising first information that comprises a first key known to the sender and to the receiver, where the generating means represents second information that comprises a second key known to the sender and to the receiver; means for outputting a waveform that comprises frequency signals from at least some individual ones of the plurality of oscillators, the generated waveform exhibiting chaotic behavior; and means for comparing the output waveform to the received waveform.

DETAILED DESCRIPTION

A more secure communication system than those previously available is provided, where the system is based on a secret key and a physical device that transforms the key (and possible also a message) into an encrypted message. The physical device itself is constructed such that it becomes essentially impossible to copy by third parties due at least to specific physical processes used for manufacturing the physical device.

The complexity of the physical device may be such that no reasonable number of challenge-response pairs is sufficient to establish an algorithm or a mathematical description or a model of the functionality of the physical device.

In the exemplary embodiments of the encryption/identification algorithm in accordance with this invention both parties (a sender and a receiver) share the secret key and the physical devices that are unknown to third parties. The physical devices are constructed such that unauthorized copying is essentially physically impossible to accomplish. At the sender the physical device is used to combine data with the secret key to produce an encrypted message. Being intercepted, the encrypted message cannot be decrypted without knowledge of the secret key, as well as possession of a corresponding physical device.

Before describing in further detail these exemplary embodiments of the invention, the following discussion may be found to be useful in gaining an understanding of the invention.

In general, one may distinguish two aspects of encrypted communications: (i) object identification (yes/no), and (ii) data transmission.

Typically these methods are based on using secret keys (although some part of the keys may be made public).

In secured data transmission these secret keys are combined with transmitted information, e.g., by modulating chaotic waveforms as in, for example, the above noted U.S. Pat. No. 5,914,553, Multistable Tunable Micromechanical Resonators", Scott G. Adams et al., or by using chaotic waveforms as spreading codes for information symbols as in, for example, Schweizer, J.; Hasler, M., Multiple access communications using chaotic signals, ISCAS'1996.

If a transmitted chaotic waveform is not known at the receiver (or is not properly synchronized with the transmitted signal), the demodulation at the receiver produces an irrelevant/useless stream of symbols.

To reiterate what was stated above, U.S. Pat. No. 5,914,553 suggests the use of tunable MEMS. However, the secure data communications with a chaotic waveform as in U.S. Pat. No. 5,914,553 is not practical, since it requires the perfect synchronization between the received chaotic waveform (delayed due to propagation conditions) and a locally generated waveform. In practice any synchronization error due to properties of chaotic signals creates a mismatch that exponentially increases in time between the received waveforms and locally generated waveforms. This mismatch will, after some period of time, destroy a match between the transmitted data and the received data. Furthermore, even with synchronization in place, the secure communications with one chaotic waveform as in U.S. Pat. No. 5,914,553 may be maintained only over a rather limited time period defined by the accuracy of the synchronization.

Possible ways to solve the foregoing problem may include: (i) using chaotic waveforms as a spreading code similar to CDMA systems (e.g., see again Schweizer et al., ISCAS'1996); (ii) inserting periodically transmitted known pilot signals, as discussed below; or (iii) using a combination of these methods. Note that insertion of pilot signals splits or partitions the chaotic waveform such that it may be seen as a collection of different chaotic waveforms.

One advantage of data transmission with chaotic waveforms is that it conceals the fact of transmission (similar in some respects to traditional broadband CDMA-type of data transmission systems.)

On the other hand, the identification addresses another problem, which is more related to privacy (e.g., data access), security and encryption.

In the case of identification the final result is simply a yes or a no, or identified/not identified (e.g., possibly represented by a single bit). Identification often is made over a short distance (e.g., access keys) such that in most cases the propagation delay may be a few meters or centimeters, and can thus be ignored. Alternatively, a very simple (outlined below) synchronization scheme, if needed at all, may be based on pilot signal transmission.

The exemplary embodiments of this invention may be seen as being directed primarily to solving the identification problem, although if combined with a suitable synchronization scheme (such as the above-mentioned pilot synchronization scheme), the exemplary embodiments may be extended as well to providing secure data transmission.

In contradistinction to the conventional approach taken by, for example, U.S. Pat. No. 5,914,553, the exemplary embodiments of this invention enable the of use an array of coupled oscillators to create a set of chaotic frequencies that can be used for identification purposes, without requiring modulation of the chaotic waveforms.

Discussing now in further detail the exemplary embodiments of this invention, consider a system of sustained oscillators (or rotators) that may be implemented by, for example, CMOS devices, or as MEMS or NEMS devices. In the following discussion there is considered the practical case of weakly coupled oscillators (active rotators), ones that maintain their limit-cycle trajectories perturbed by coupling. This enables one to ignore the coupling affect on oscillator's amplitudes, and to instead describe the system only with phase relationships as:

$$\frac{d\theta_n}{dt} = \omega_n + Q_n(\theta_1, \theta_2, \ldots, \theta_N); \quad n = 1, \ldots, N \quad (1)$$

where $\omega_n$ is the partial (uncoupled) frequency of the n-th oscillator, and $Q_n$ presents a coupling effect on phase $\theta_n$ from all other oscillators and is described as $2\pi$-periodic in each of its arguments. Coupling is herewith presented as interactions amongst all pairs of oscillators $$Q_n(\theta_1, \theta_2, \ldots, \theta_N) = \sum_{m=1}^{N} q_{nm}(\theta_m, \theta_n).$$

In the case of weak coupling, $q_{nm}(\theta_m, \theta_n) = q_{nm}(\theta_m - \theta_n)$ and $q_{nm}(0) = 0$, i.e., there are no interactions if identical oscillators are in phase. Such coupling is known as diffusive coupling and may be described as:

$$\frac{d\theta_n}{dt} = \omega_n + \sum_{m=1}^{N} q_{nm}(\theta_m - \theta_n). \quad (2)$$

A special case of equation (2), $q_{nm}(\theta) = k/N \sin(\theta)$, corresponds to coupling with strength $k_{nm}$ among n and m oscillators, and can be described as a phase-coupled Kuramoto model (e.g., see Kuramoto Y., Lecture Notes in Phys. 30, Springer (1975) and Acebron J., Bonilla L., Vicente C. and Ritort F., The Kuramoto model: A simple paradigm for synchronization phenomena, Reviews of Modern Physics 77, January 2005, pg. 137-185. The phase-coupled Kuramoto model is given by:

$$\frac{d\theta_n}{dt} = \omega_n + \frac{1}{N}\sum_{m=1}^{N} k_{nm}\sin(\theta_m - \theta_n); \quad n = 1, \ldots, N. \quad (3)$$

Depending on the sign of $k_{nm}$ the coupling may be attractive (k>0) or repulsive (k<0).

Figure 1:
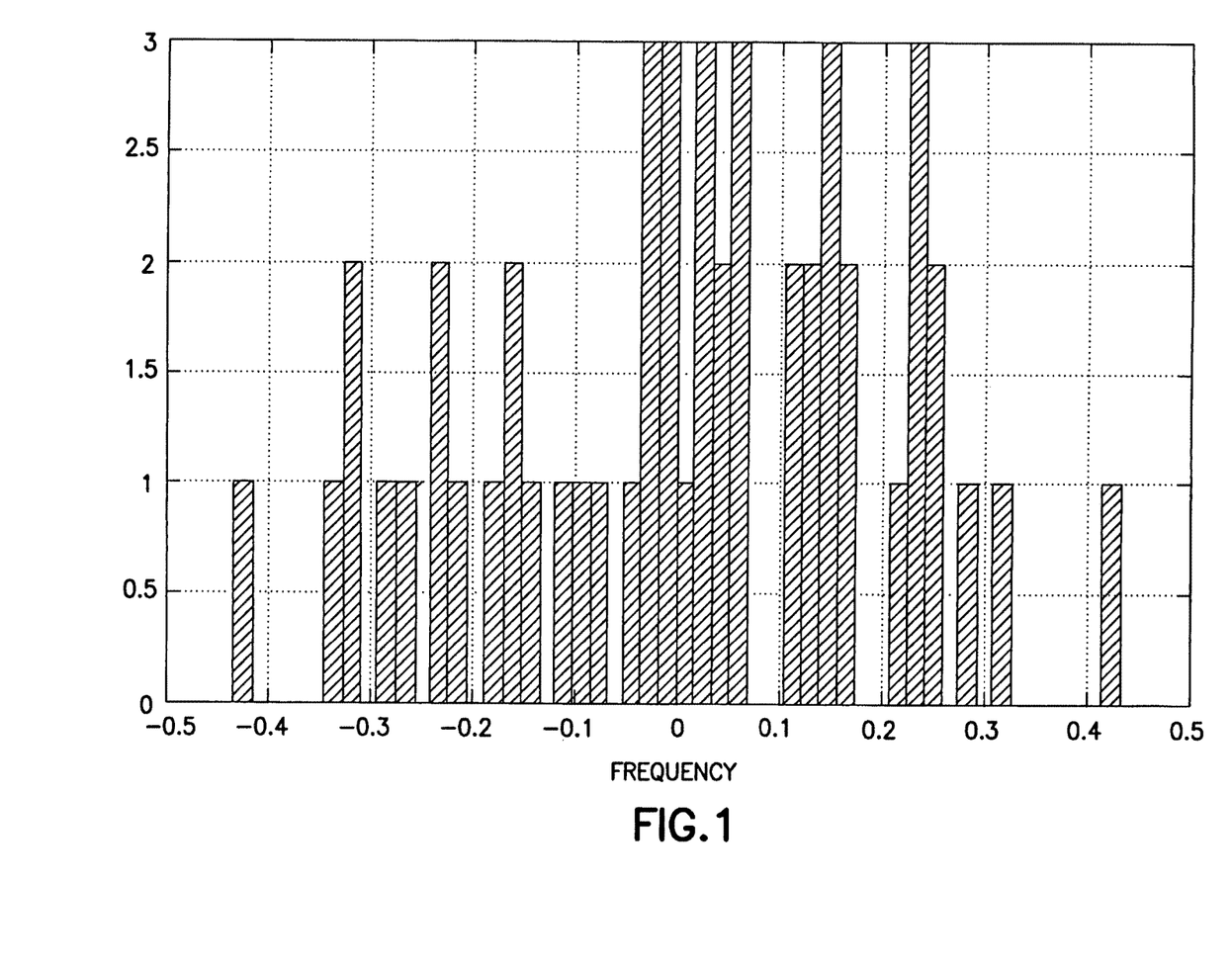
FIG. 1 depicts normalized frequencies for an exemplary 50 coupled oscillators.

To illustrate the exemplary embodiments of this invention consider a set of globally ($k_{nm}=k$) repulsively (k<0) coupled oscillators. Even in this relatively simple arrangement the coupled oscillators may generate chaotic waveforms. As an example, consider N=50 oscillators with normalized frequencies as depicted in FIG. 1. The time evolution of the frequencies of N=50 globally coupled oscillators (obtained by numerically solving the ordinary differential equation (ODE) of equation (3)) is shown in FIG. 2.

Figure 2:
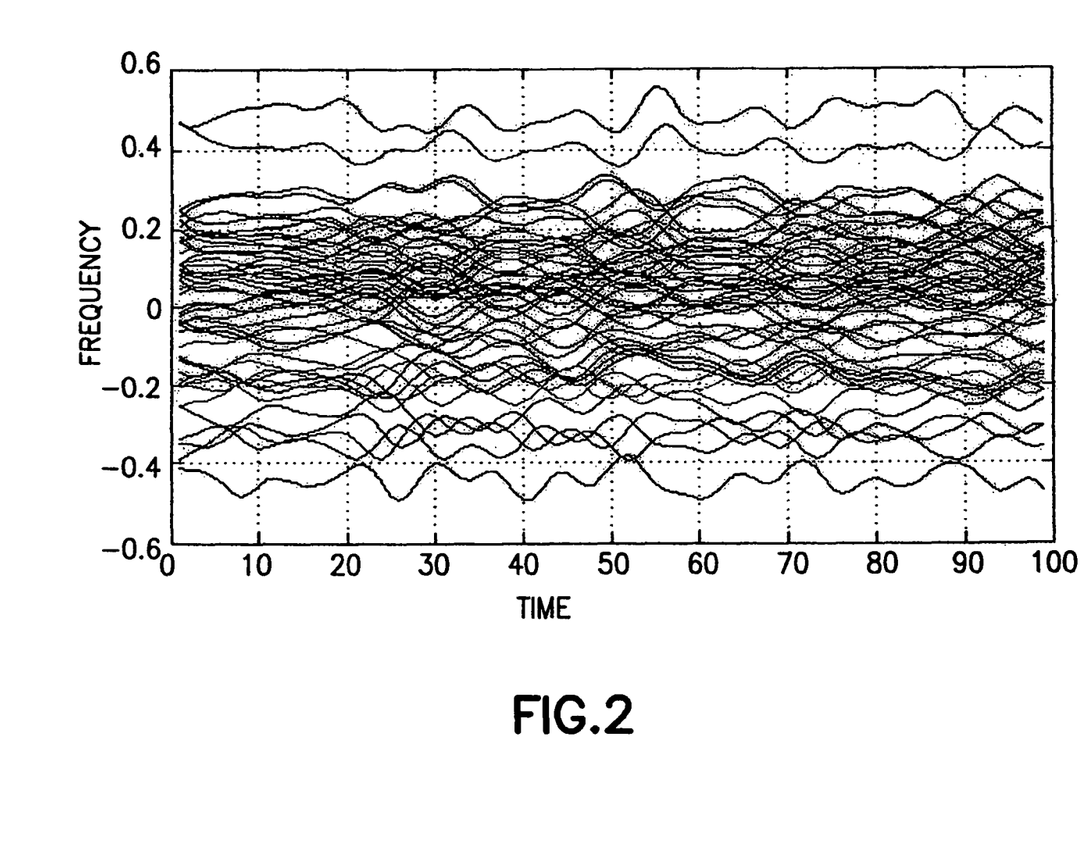
FIG. 2 illustrates the time-evolution of oscillator frequencies shown in FIG. 1.

As can be observed in FIG. 2, the time evolution of frequencies shows chaotic (not quasi-periodic) behavior that is seemingly impossible to predict. That is, by observing a given frequency trajectory, for example up to time t=50, one cannot predict the dynamics for t>50 (without knowing the ODE of equation (3)).

The oscillators in the array are numbered. For identification purposes one may transmit different subsets of frequencies n={$n_{m1}$, $n_{m2}$, . . . ,$n_{ml}$} which may be different at different time periods $\delta t_1$, $\delta t_2$, . . . ,$\delta t_M$.

As an example, when implemented using MEMS/NEMS technology a set of frequencies $\Omega$={$\omega_1$, $\omega_2$, . . . , $\omega_N$}, and the coupling matrix K={$k_{nm}$}, may be considered in accordance with an aspect of this invention to form a part of a security key that is embedded into hardware, and which is essentially not amendable to being copied by an unauthorized third party using another technology process. Initial conditions (in addition to the excitation pattern), the used sequence of (subsets of) frequencies n, and a set of observation intervals $\Delta$={$\delta t_1$, $\delta t_2$, . . . ,$\delta t_M$} together may form another part of the security key, one that may be partly transmitted publicly via another communication channel to the receiver to initialize the generation of similar chaotic waveforms.

Note that even if an eavesdropper intercepts and records the transmitted waveforms, the security is maintained since the eavesdropper must (i) record all waveforms from all used oscillators (e.g., N=50 in FIG. 2), and (ii) have knowledge of the sequence of used (subset of) frequencies which may be changing in time, n=n(t) That is, one subset of frequencies n(t₁) may be used for a first interval of time, and another subset of frequencies may be used during a second interval of time n(t₂), where members of the first subset of frequencies may or may not overlap with the members of the second subset of frequencies. Furthermore, since by observation it is impossible to predict the frequency behavior over time for even one of the N oscillators, then by simply increasing the time period of transmission, and changing the transmission in time, makes reconstruction of the transmitted waveforms essentially impossible by an unauthorized third party.

Typically MEMS/NEMS devices generate RF frequencies which may be transmitted directly, thereby eliminating a need for a modulator at the transmitter (TX). To provide synchronization at the receiver (RX), if needed, known pilot signals (e.g., which may be embodied as fixed frequency intervals (or tones)) may be periodically inserted into the chaotic waveforms. At the receiver a simple frequency discriminator (e.g., one similar to those used in analog FM radio) may provide a measure of difference (e.g., $\Delta f(t)=f_{TX}(t)-f_{RX}(t)$) allowing a decision/identification to be made (e.g., if $\Delta f(t)<$Threshhold).

Figure 3:
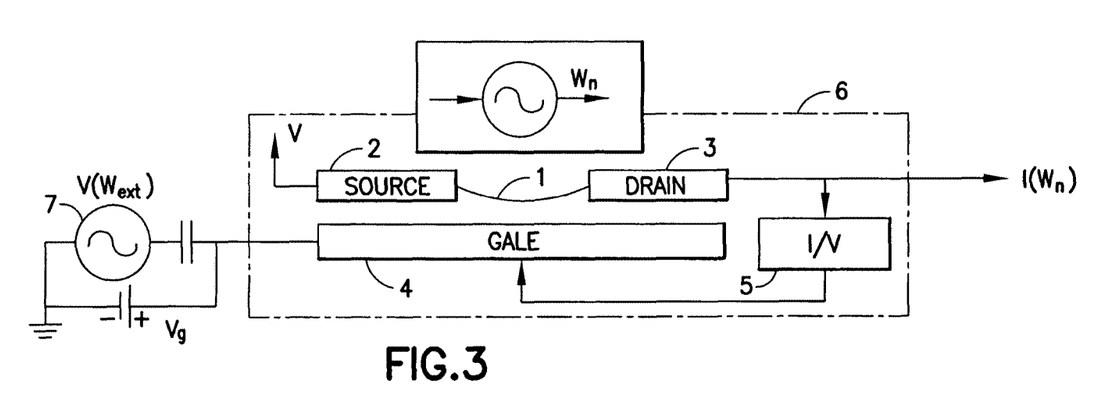
FIG. 3 is a simplified diagram of a non-limiting embodiment of a tunable CNT-based NEMS oscillator.

Described now is one non-limiting example of a MEMS/NEMS embodiment. Referring to FIG. 3, consider a suspended rod 1 in the case of MEMS, or a carbon-nanotube (CNT) in the case of NEMS, that is clamped on both ends to metal pads (source 2 and drain 3) and capacitively coupled to a gate 4. Note that the structure shown in FIG. 3 may be similar to a tunable CNT-based NEMS reported by Sazonova V., Yaish Y., Uesteenel H., Roundy D., Arias T. and McEuen P., A tunable carbon nanotube electromechanical oscillator, Nature 431, September 2004, pg. 286-287. Similar to MEMS, there may be a positive feedback loop that converts the output current of the drain 3 into a voltage (shown as I/V block 5) which then is fed back to the gate 4 to excite CNT resonance modes. Provided with a proper positive feedback this structure may be used as a limit-cycle oscillator 6 (rotator), shown generally within the dashed-dot box. The applied DC gate voltage $V_g$ changes the CNT strain and thus controls the eigenmodes, which are excited by an external AC source 7 with frequency $W_{ext}$.

One dimensional motion of a CNT can be described by the Duffing equation. It can be shown that for small displacements and weak interactions globally coupled Duffing oscillators may be described by equation (3).

Figure 4A:
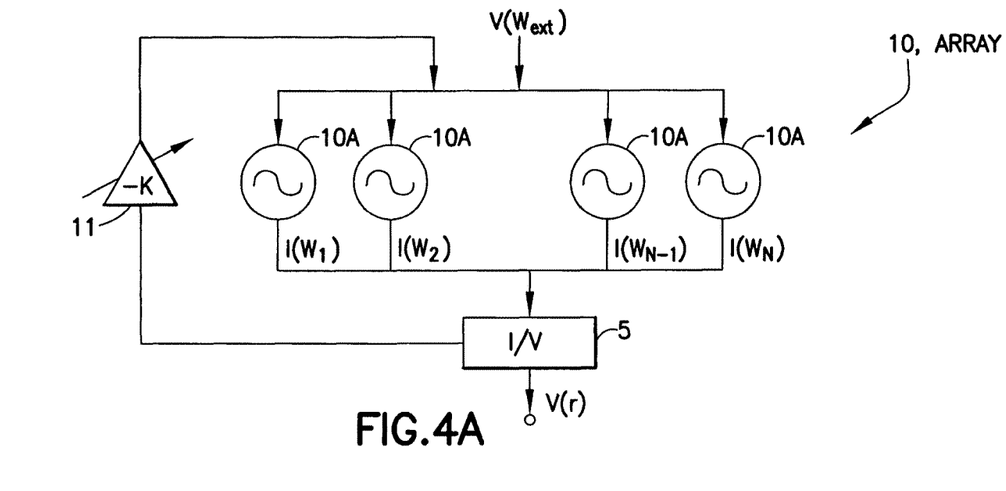
FIGS. 4A and 4B, collectively referred to as FIG. 4, each show an array of globally coupled oscillators and related circuitry.

As an illustrative and non-limiting example consider a system or array 10 of repulsively and globally coupled oscillators 10A as shown in FIG. 4. In the example of FIG. 4A the current outputs from the oscillators 10A ($I(\omega_i)$), each of which may be similar to the oscillator 6 shown in FIG. 3, are combined by connecting to a common load, followed by feedback via current/voltage conversion (I/V block 5). The amount of the feedback may be controlled by one or more operational amplifiers 11 with tunable amplification. The feedback coupling strength k may be digitally controlled (and may form a part of the secure key implemented in hardware). The array 10 and related components may form part of a transmitter or sender 20, and the output signal V(r) is the signal sent through a channel 30 to a receiver 40.

The time evolution of the frequencies of N=50 globally and repulsively (k<0) coupled oscillators as at FIG. 4A (obtained by numerically solving the ordinary differential equation (ODE) of equation (3)) is shown in FIG. 2.

Note that FIG. 4A is taken as an illustrative example to demonstrate the chaotic behavior of the repulsively coupled oscillator array 10.

Figure 4B:
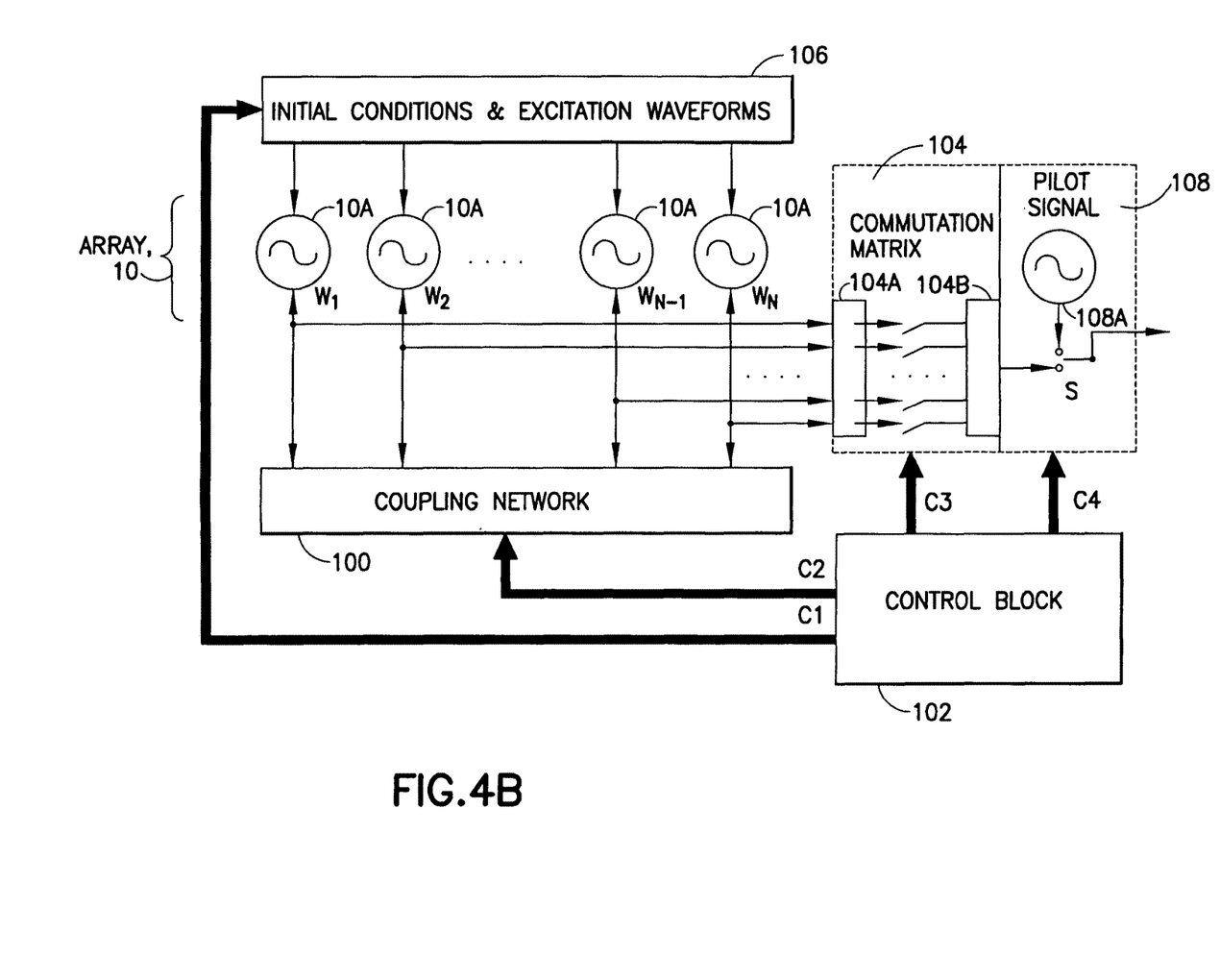

An exemplary and non-limiting embodiment is shown at FIG. 4B. Here an arbitrary coupling matrix may be realized by a controllable coupling network 100 in conjunction with a controller implemented as a control block 102 having a plurality of control outputs C1, C2, C3, C4 (C2 in this example controls coupling network 100). To implement a selection of subsets of frequencies n one may utilize a commutation matrix 104 that includes time dependent switches (with possibly different gain factors) 104A and a cumulative function 104B monitored by a control signal C3. Initial conditions and excitations waveforms represented by block 106 are controlled by C1.

Note that if the above-mentioned pilot signal is used, then the output of oscillator array 10 may be periodically interrupted (shown logically as a switch S within pilot signal block 108 in FIG. 4B) to insert the pilot signal frequency generated by a pilot signal oscillator 108A.

Note that a set of control parameters $C=\{C_1, C_2, C_3, C_4, n, K, \Omega\}$ may be seen as a (partly publicly shared) secret key.

Figure 5A:
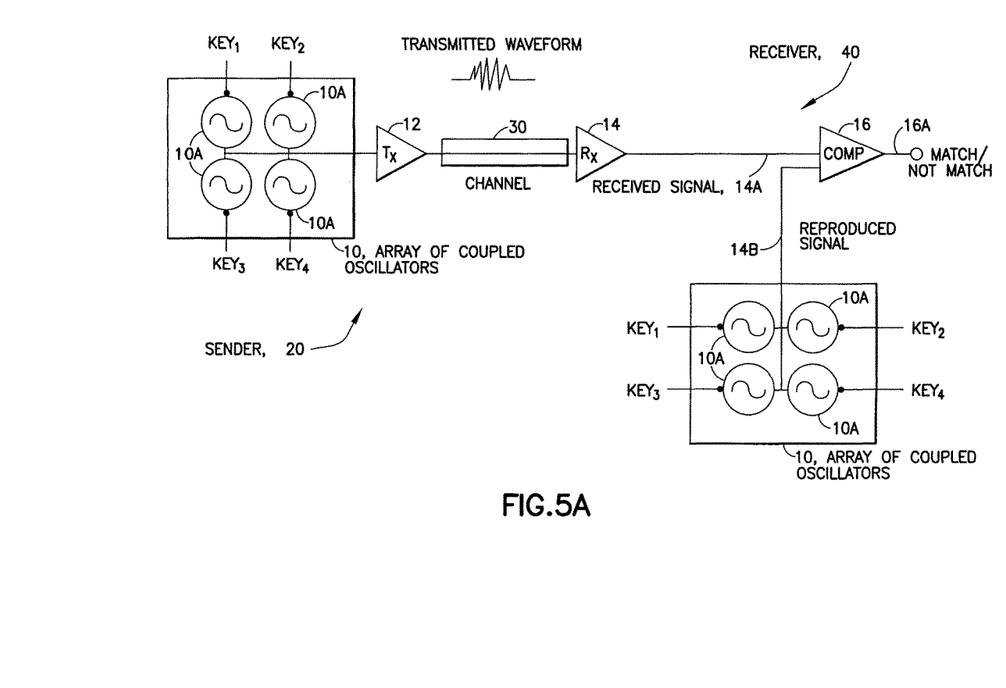
FIGS. 5A and 5B are each a simplified block diagram of an embodiment of a sender and a receiver that each employ an array of coupled oscillators or resonators that embody a physical component of an encryption/identification algorithm enabling secure communication.

Referring to FIG. 5A, an aspect of this invention thus resides in the use the array of coupled oscillators or resonators 10 to implement the physical device to generate a signal that is essentially impossible to reproduce without a similar physical array of coupled oscillators or resonators 10, as well as the use of secret information descriptive of the initial conditions of the array of coupled oscillators or resonators 10. Both the sender 20 and the receiver 40 each have an instance of the array of coupled oscillators or resonators 10 (which may be referred to herein generically as "devices") and the secret information (e.g., presented as a PIN code). The sender 20 and receiver 40 may publicly share at least some information on the initial conditions of the array of coupled oscillators or resonators 10. Based on this information both the sender 20 and the receiver 40 are enabled to generate the same signal, which at the receiver 40 reproduces the signal generated at the sender 20. In this embodiment the receiver 40 is enabled to identify the sender 20 as being authentic if the reproduced signal at the receiver 40 matches (according to a predefined measure or threshold) the received signal.

More particularly, in the exemplary embodiment shown in FIG. 5A the sender 20 also includes a transmitter 12 that transmits a signal generated by the array of coupled oscillators or resonators 10 through a channel 30. The channel 30 may be any type of signal conveying medium, including wire, cable, optical fiber, or a wireless (e.g., radio frequency or optical) medium (or a combination of two or more of these), and the transmitter 12 is thus configured in accordance with the particular requirements of the channel. The receiver 40 includes suitable receiver circuitry 14 having an input coupled to the channel 30 to generate a received signal 14A. A comparator function 16 compares the received signal 14A to a locally reproduced signal 14B output from the corresponding array of coupled oscillators or resonators 10 to generate a match/not match signal 16A based on some fixed or variable Threshold value. The presence of a match signal is indicative that the received signal 14A originated from an authorized and authentic sender, i.e., a party having a corresponding identical or substantially identical (within process tolerances) one of the array of coupled oscillators or resonators 10, as well as knowledge of a secret information or code (key).

In this embodiment the sender 20 employs the secret code, also referred to as a key (e.g., a PIN code), and the receiver has knowledge of the same key. In this non-limiting embodiment the array of coupled oscillators or resonators 10 is shown comprised of four oscillators 10A each of which is driven (excited) by one bit or portion of the key (e.g., by key bits $Key_1$, $Key_2$, $Key_3$, $Key_4$). In other embodiments the array of coupled oscillators or resonators 10 may include more or less than four oscillators 10A (resonators). For example, the array of coupled oscillators or resonators 10 may include as few as two oscillators 10A, or it may include 50 oscillators 10A, or it may include some hundreds or even thousands of the oscillators 10A. The array may be regular (e.g., square) in shape (as shown), or it may have any other shape (e.g., it may be rectangular, or triangular, or circular, or ovoid in shape as non-limiting examples).

Note that other coding/encryption methods may be used with the array of coupled oscillators or resonators 10.

During an identification process the transmitter 12 transmits a waveform output by the array of coupled oscillators or resonators 10. The waveform is received and compared with the locally (synchronously) generated reproduced signal waveform 14B. An identification/decryption event occurs when the received and locally generated waveform trajectories are found to be equal to with some predetermined tolerance.

Figure 5B:
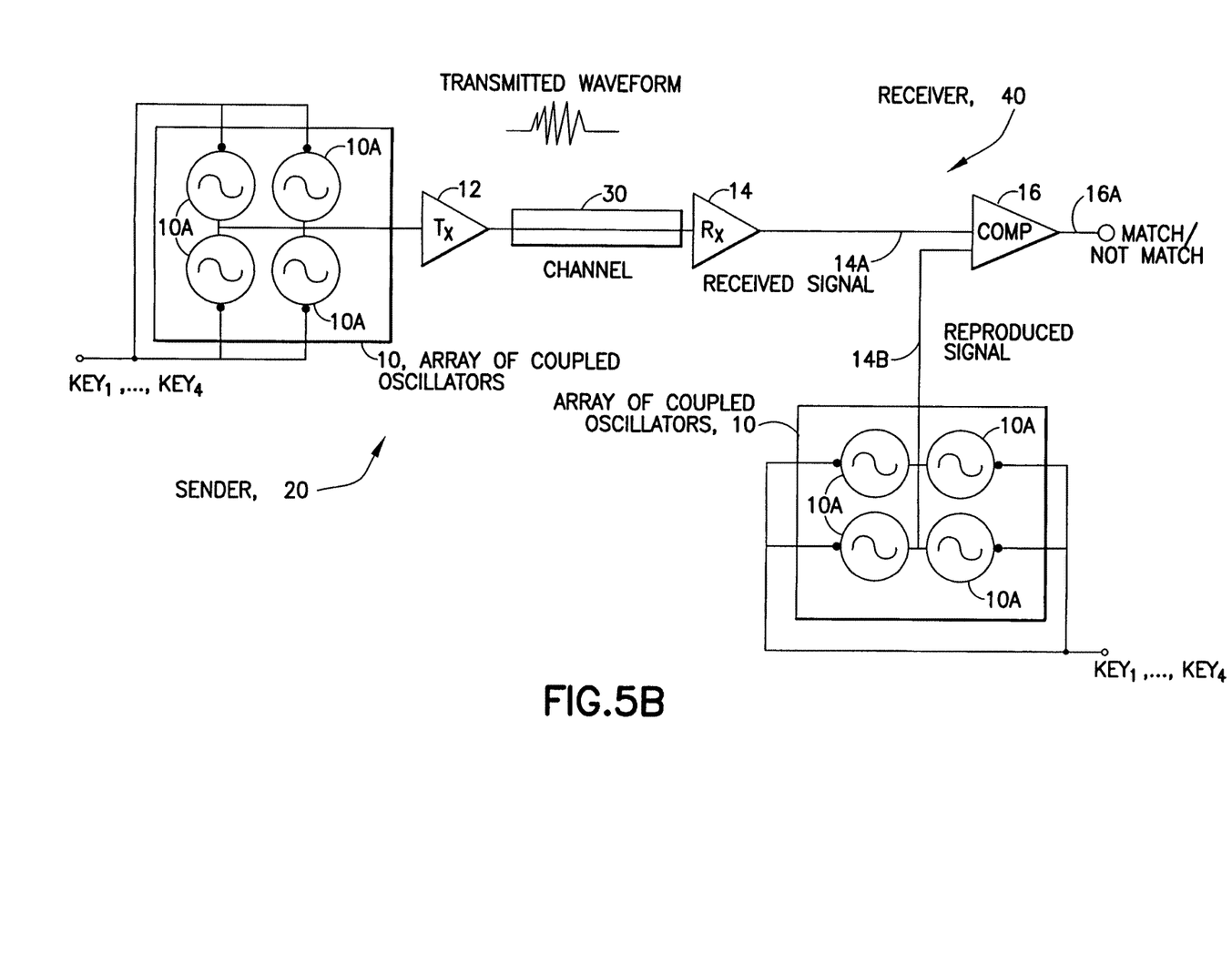

In the exemplary embodiment shown in FIG. 5A the key information ($Key_1$, $Key_2$, $Key_3$, $Key_4$) is applied in parallel to the individual oscillators 10A (resonators) of the array of coupled oscillators or resonators 10. In the exemplary embodiment shown in FIG. 5B the key information ($Key_1$, $Key_2$, $Key_3$, $Key_4$) is applied sequentially to all of individual oscillators 10A (resonators) of the array of coupled oscillators or resonators 10. In either case the application of the key information provides the excitation signal that drives the oscillator array 10, and the individual oscillators 10A generate characteristic frequency signal outputs (which may be different for each oscillator 10A of the array 10). The output frequency signal of each oscillator 10A is also influenced; due to the electromagnetic and/or physical coupling between some or all of them. The application of the key information ($Key_1$, $Key_2$, $Key_3$, $Key_4$) may be viewed as establishing a secret part of the initial conditions of the array of coupled oscillators or resonators 10.

Note that all of the oscillators 10A may be driven by the same excitation signal, as in the example of FIG. 4, which is known at both the sender 20 and the receiver 40, and the key information can comprise one or more of the parameters discussed above, such as knowledge of the ODE of equation (3), knowledge of the initial conditions (in addition to the excitation pattern), the used sequence of (subsets of) frequencies, and a set of observation intervals $\Delta = \{\delta t_1, \delta t_2, \ldots, \delta t_M\}$, as well as possibly the strength (and/or variability) of the feedback parameter k, if not forming part of the hardware-based (hardwired) security aspect.

One exemplary implementation of the array of coupled oscillators or resonators 10 is based on MEMS or NEMS components. A coupling matrix that exists between the plurality of oscillators or resonators of the array 10 may be described not only by a connectivity matrix, but also by, as non-limiting examples, different geometries, strengths and types of coupling. The dynamics of the array of coupled oscillators or resonators 10 can be described by a set of differential equations with an exponentially increasing number (with respect to the number of individual oscillators) of degrees of freedom. Depending on the coupling matrix and the initial conditions the array of coupled oscillators or resonators 10 may generate a large number (e.g., a substantially infinite number) of waveforms exhibiting from quasi-periodic to chaotic trajectories.

The initial conditions may include, as non-limiting examples, a description of each oscillator, a predetermined mask of coupling parameters (defined-with a certain accuracy) and the applied force on each oscillator (e.g., defining location, strength, phase, and waveform of the excitation). These initial conditions may be seen as a multi-dimensional security key (at least partly) implemented in the physical device itself. In general, some portion of the initial conditions may be secret while other parts may be public.

It can be noted that an aspect of these exemplary embodiments is a design-dependent set of initial conditions that generate (pseudo) chaotic waveforms used as the secret initial conditions.

The high degree of security that is made possible is based at least in part on the (pseudo) chaotic nature of the generated waveforms, resulting in large deviations in the produced signals even with small differences in the physical layout or the initial conditions of the array of coupled oscillators or resonators 10. The property of a chaotic waveform generator is that for (slightly) different initial conditions the resulting trajectories exponentially diverge in time.

Thus, even if a third party were to reproduce the coupling matrix (to obtain differential equations descriptive the dynamics of the array of coupled oscillators or resonators 10), knowledge of the coupling matrix itself is not sufficient to generate the chaotic waveform trajectory to enable a successful identification to be made. This is true at least for the reason that a property of a chaotic waveform generator is that for (slightly) different initial conditions the resulting trajectories exponentially diverge in time. This implies that one would need to also find, with the certain accuracy, at least a multi-dimensional excitation mask (i.e., initial conditions), which is highly unlikely.

The array of coupled oscillators or resonators 10 may be implemented using mechanical (e.g., MEMS/NEMS) systems, traditional electronic components (e.g., transistor-based oscillator/resonator circuits) and combinations of these. Further by example, the array of coupled oscillators or resonators 10 may be based on a CNT resonator embodiment, such as one described in commonly owned and copending U.S. patent application Ser. No. 12/072,972, filed Feb. 9, 2008, "Apparatus, Method, and Computer Program Product Providing Edgeless Carbon Nanotube Resonator Arrays", by Risto H. Kaunisto, Jari Kinaret, Eleanor Campbell, Andreas Isaacsson, Sang-Wook Lee and Anders Eriksson.

In practice, the array of coupled oscillators or resonators 10 may be obtained from a wafer fabricated to include multiple instances of such arrays 10 that are at least nominally matched to one another within wafer fabrication processing limits. Within each array 10 variations of the constituent components may be made such as controllably, by design, varying transistor sizes, channel widths and depths and/or during fabrication, such as by varying doping profiles and levels, so as to even further render the resulting array more immune to analysis and copying. In addition, the relative placements and layouts of the individual devices, and the conductive interconnects (e.g., metallization) between them, may be designed so as to enhance coupling and cross-talk between all or some of the components of the array 10. In addition, different values of weighting elements may be used at the excitation inputs of different oscillators 10A so that application of same valued excitation signals (e.g., key information ($Key_1$, $Key_2$, $Key_3$, $Key_4$)) results in different values of excitation levels at the individual oscillators 10A.

Note that the array of coupled oscillators or resonators 10 may be fabricated and provided as a discrete component, or it may be provided as part of another component, such as part of an integrated circuit that includes radio frequency circuitry and/or baseband circuitry for a wireless communication device, such as a cellular phone or a WLAN modem.

In practice, it is desirable that the sender 20 and the receiver 40 are time synchronized. Time synchronization may be implemented, as one non-limiting example, through the use of a synchronization signal transmitted by the sender 20.

Synchronization may also be achieved, or at least aided, by the use of the pilot signal or pilot signals (e.g., one or more fixed or variable frequency tones inserted within the transmitted chaotic waveform) as described above.

One significant advantage and technical effect that is obtained by the use of these exemplary embodiments is the high security level that is achieved due to the multidimensional secret key that is inherent in the physical device (the array of coupled oscillators or resonators 10). As a result, even if an original device is lost or stolen, it is essentially technically not feasible to make an exact copy of the original device by third parties, even with the access to the original device. Further in this regard, in order to make a workable copy of the original device a third party would need knowledge of the set of differential equations with all parameters (not obtainable by reverse engineering of the original device), as well as knowledge of the original technology and a complete description of manufacturing processes.

Further, if an original device is lost or stolen it still cannot be fully used to by third parties to access information due to the presence of the secret part of the initial conditions (e.g., the PIN code).

Further, if it is believed that an original device has been compromised, one may simply change the secret initial conditions, such as by changing the PIN code.

Figure 6:
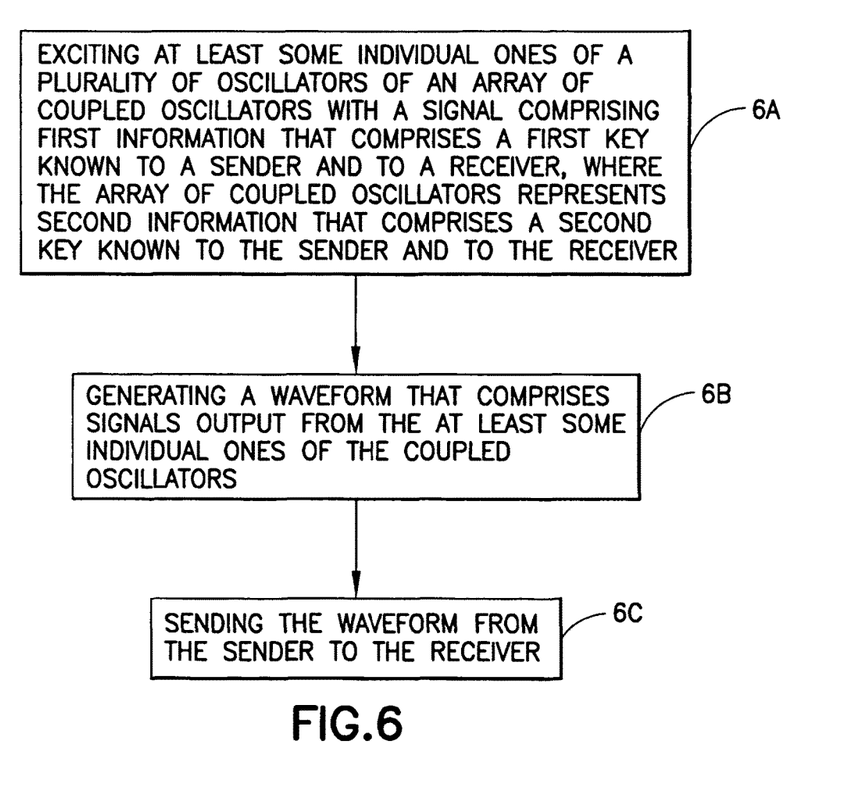
FIG. 6 is a logic flow diagram that illustrates the operation of a first method in accordance with the exemplary embodiments of this invention.

FIG. 6 is a logic flow diagram that illustrates the operation of a first method in accordance with the exemplary embodiments of this invention. At Block 6A there is a step of exciting at least some individual ones of a plurality of oscillators of an array of coupled oscillators with a signal comprising first information that comprises a first key known to a sender and to a receiver, where the array of coupled oscillators represents second information that comprises a second key known to the sender and to the receiver. At Block 6B there is a step of generating a waveform that comprises signals output from the at least some individual ones of the coupled oscillators. At Block 6C there is a step of sending the waveform from the sender to the receiver.

In the method of the preceding paragraph the first information comprises initial conditions.

In the method of the preceding paragraph the initial conditions comprise at least one of an excitation pattern, used subsets of frequencies, and a set of observation intervals.

In the method of the preceding paragraph, the information descriptive of the initial conditions is sent to the receiver.

In the method of the preceding paragraphs the second information comprises a set of frequencies and a coupling matrix.

In the method of the preceding paragraphs the first information, or the second information, comprises strength of a feedback signal coupled from an output of said array of coupled oscillators to an input of said array of coupled oscillators.

The method as in the preceding paragraphs, where there is also performed a step of embedding at least one pilot signal into the generated waveform.

Figure 7:
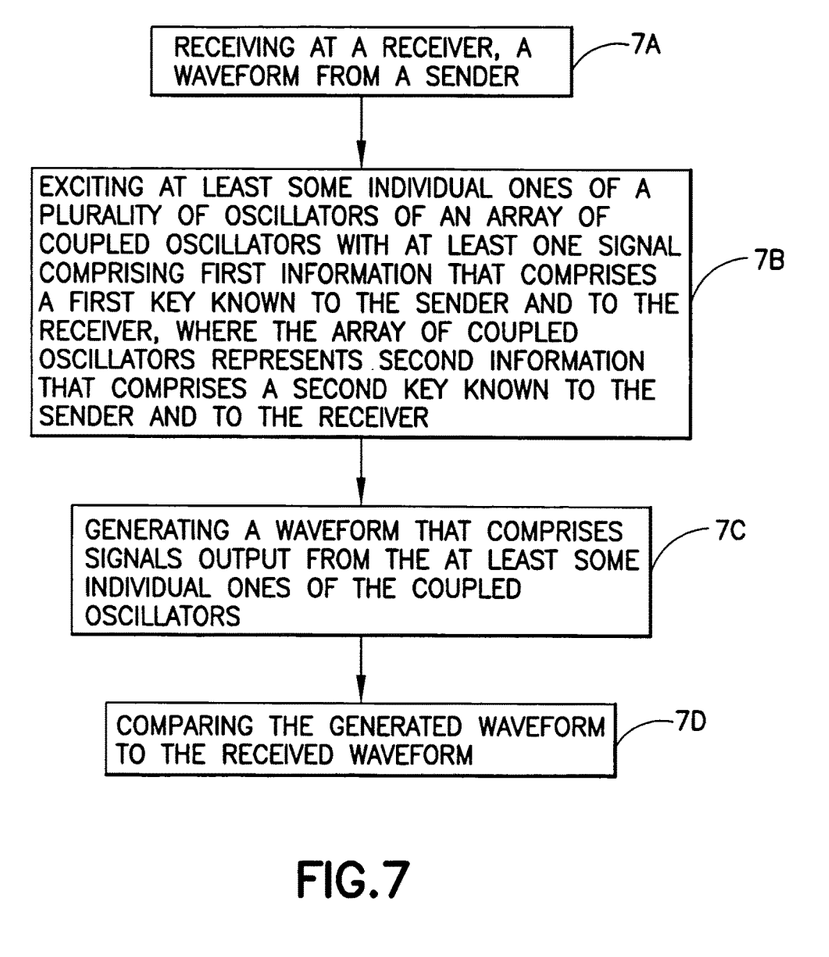
FIG. 7 is a logic flow diagram that illustrates the operation of a second method in accordance with the exemplary embodiments of this invention.

FIG. 7 is a logic flow diagram that illustrates the operation of a second method in accordance with the exemplary embodiments of this invention. At Block 7A there is a step of receiving, at a receiver, a waveform from a sender. At Block 7B there is a step of exciting at least some individual ones of a plurality of oscillators of an array of coupled oscillators with at least one signal comprising first information that comprises a first key known to the sender and to the receiver, where the array of coupled oscillators represents second information that comprises a second key known to the sender and to the receiver. At Block 7C there is a step of generating a waveform that comprises signals output from the at least some individual ones of the coupled oscillators. At Block 7D there is a step of comparing the generated waveform to the received waveform.

In the method of the preceding paragraph, where if a result of comparing indicates a difference between the generated waveform and the received waveform that is less than a threshold amount, then further including a step of indicating that the sender is an authorized sender.

In the method of the preceding paragraphs the first information comprises initial conditions.

In the method of the preceding paragraph the initial conditions comprise at least one of an excitation pattern, used subsets of frequencies, and a set of observation intervals.

In the method of the preceding paragraph the information descriptive of the initial conditions is received from the sender.

In the method of the preceding paragraphs the second information comprises a set of frequencies and a coupling matrix.

In the method of the preceding paragraph the first information, or the second information, comprises strength of a feedback signal coupled from an output of said array of coupled oscillators to an input of said array of coupled oscillators.

The method of the preceding paragraph, also comprising receiving at least one pilot signal that is embedded in the received waveform.

The various blocks shown in FIGS. 6 and 7 may be viewed as method steps, and/or as operations that result at least in part from operation of computer program code, and/or at least in part as a plurality of coupled logic circuit elements constructed to carry out the associated function(s).

In general, the various exemplary embodiments may be implemented at least in part by hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or using some other pictorial representation, it is well understood that these blocks, apparatus, systems, techniques or methods described herein may be implemented at least in part in, as non-limiting examples, hardware, software, firmware, special purpose circuits or logic, general purpose hardware or controller or other computing devices, or some combination thereof. For example, the control block 102 of FIG. 4B may be implemented at least in part as a controller that comprises one or more data processors operating in accordance with computer program instructions that are stored in a tangible memory medium.

It should be further appreciated that at least some aspects of the exemplary embodiments of the inventions may be practiced in various components such as integrated circuit chips and modules. The exemplary embodiments of this invention may thus be realized at least in part in an apparatus that is embodied as an integrated circuit, where the integrated circuit may comprise circuitry (as well as possibly firmware) for embodying at least the array of coupled oscillators or resonators 10, and may also include one or more of a data processor, a digital signal processor, baseband circuitry and radio frequency circuitry that are configurable so as to operate in accordance with the exemplary embodiments of this invention.

These exemplary embodiments also pertain to apparatus that comprises means for generating a time evolution of frequencies output from at least some of a plurality of globally coupled oscillators; means for exciting at least some individual ones of the plurality of oscillators with a signal comprising first information that comprises a first key known to a sender and to a receiver, where the generating means represents second information that comprises a second key known to the sender and to the receiver; means for outputting a waveform that comprises frequency signals from at least some individual ones of the plurality of oscillators, the generated waveform exhibiting chaotic behavior; and means for sending the waveform from the sender to the receiver.

These exemplary embodiments also pertain to apparatus that comprises means for receiving a waveform from a sender at a receiver; means for generating a time evolution of frequencies output from at least some of a plurality of globally coupled oscillators; means for exciting at least some individual ones of the plurality of oscillators with a signal comprising first information that comprises a first key known to the sender and to the receiver, where the generating means represents second information that comprises a second key known to the sender and to the receiver; means for outputting a waveform that comprises frequency signals from at least some individual ones of the plurality of oscillators, the generated waveform exhibiting chaotic behavior; and means for comparing the output waveform to the received waveform.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, the sender 20 and the receiver 40 may each be embodied in a mobile device, such as a cellular phone or a portable computer, or one of them may be embodied as a mobile device and the other as a wireless network infrastructure node or component, or one of them may be embodied as a mobile device and the other as a node, such as a data processor, a computer, or a server (as non-limiting examples) that is reachable though a data communications network. In other embodiments neither the sender or the receiver may be embodied as a mobile device. Note as well that in some embodiments there may be two or more of the receivers 40 coupled to one of the senders 20 through the same channel 30 or through different channels.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
exciting at least some individual ones of a plurality of oscillators of an array of globally, repulsively coupled oscillators with a signal comprising first key information known to a sender and to a receiver, and said array of globally, repulsively coupled oscillators representing second key information known to the sender and to the receiver;
generating a waveform that comprises signals output from the at least some individual ones of the globally, repulsively coupled oscillators; and
sending the waveform from the sender to the receiver, wherein each said oscillator has an associated uncoupled frequency.

2. The method of claim 1, where the first key information comprises initial conditions.

3. The method of claim 2, where the initial conditions comprise at least one of an excitation pattern, used subsets of frequencies, and a set of observation intervals.

4. The method as in claim 2, where first key information descriptive of said initial conditions is sent to the receiver.

5. The method as in claim 1, where the second key information comprises a set of frequencies and a coupling matrix.

6. The method as in claim 1, where said first key information comprises strength of a feedback signal coupled from an output of said array of globally, repulsively coupled oscillators to an input of said array of globally, repulsively coupled oscillators.

7. The method as in claim 1, where said second key information comprises strength of a feedback signal coupled from an output of said array of globally, repulsively coupled oscillators to an input of said array of globally, repulsively coupled oscillators.

8. The method as in claim 1, where the generated waveform is comprised of a time evolution of frequencies generated by at least some of said oscillators and exhibits chaotic behavior, and further comprising embedding at least one pilot signal into the generated waveform.

9. The method of claim 1, wherein said array of globally, repulsively coupled oscillators comprises multiple oscillators that each have a different associated uncoupled frequency.

10. An apparatus comprising an array of coupled oscillators that in combination are configured to generate a waveform in response to at least one excitation signal, wherein the waveform comprises signals output from at least some individual ones of the coupled oscillators, and said array of coupled oscillators configured to represent, in response to application of the at least one excitation signal, a multi-dimensional security key that is shared between a sender of the waveform and a receiver of the waveform,
  wherein each said oscillator has an associated uncoupled frequency, and said array of coupled oscillators comprises an array of globally, repulsively coupled oscillators.

11. The apparatus as in claim 10, where said oscillators comprise at least one of micro-electromechanical system components, nano-electromechanical system components, and transistor-based components.

12. The apparatus as in claim 10, where said oscillators comprise carbon nanotubes.

13. The apparatus as in claim 10, further comprising circuitry configured to convert a current output of said array to a voltage output, said voltage output comprising said waveform.

14. The apparatus as in claim 10, further comprising a commutation circuit coupled to an output of said array of coupled oscillators and configured to select a subset of frequencies n output from said array.

15. The apparatus as in claim 10, where said waveform is comprised of a time evolution of frequencies generated by at least some of said oscillators and exhibits chaotic behavior.

16. The apparatus as in claim 10, further comprising a pilot signal generator coupled to an output of said array of coupled oscillators and configured to periodically embed a predetermined frequency signal into the waveform.

17. The apparatus as in claim 10, further comprising a feedback circuit coupled between an output of said array and an input of said array.

18. The apparatus as in claim 17, where said feedback circuit is configured to provide an amount of feedback that comprises a part of said multi-dimensional security key.

19. The apparatus as in claim 18, where strength of the feedback is variable over time.

20. The apparatus of claim 10, wherein the apparatus is an integrated circuit.

21. A method, comprising:
  receiving, at a receiver, a waveform from a sender;
  exciting at least some individual ones of a plurality of oscillators of an array of globally, repulsively coupled oscillators with at least one signal comprising first key information known to the sender and to the receiver, and said array of globally, repulsively coupled oscillators representing second key information known to the sender and to the receiver;
  generating a waveform that comprises signals output from the at least some individual ones of the globally, repulsively coupled oscillators; and
  comparing the generated waveform to the received waveform,
  wherein each said oscillator has an associated uncoupled frequency.

22. The method of claim 21, where, if a result of comparing indicates a difference between the generated waveform and the received waveform that is less than a threshold amount, indicating that the sender is an authorized sender.

23. The method as in claim 21, where the first key information comprises initial conditions.

24. The method of claim 23, where the initial conditions comprise at least one of an excitation pattern, used subsets of frequencies, and a set of observation intervals.

25. The method as in claim 23, where the first key information descriptive of said initial conditions is received from the sender.

26. The method as in claim 23, where the second key information comprises a set of frequencies and a coupling matrix.

27. The method as in claim 23, where said first key information comprises strength of a feedback signal coupled from an output of said array of globally, repulsively coupled oscillators to an input of said array of globally, repulsively coupled oscillators.

28. The method as in claim 21, where said second key information comprises strength of a feedback signal coupled from an output of said array of globally, repulsively coupled oscillators to an input of said array of globally, repulsively coupled oscillators.

29. The method as in claim 21, further comprising receiving at least one pilot signal that is embedded in the received waveform.

30. An apparatus comprising at least one processor and at least one memory including computer program code; the at least one memory and the computer program code configured, with the at least one processor, to cause the apparatus to perform at least the following:
  exciting at least some individual ones of a plurality of globally, repulsively coupled oscillators with a signal comprising first key information known to a sender and to a receiver, and said array of globally, repulsively coupled oscillators representing second key information known to the sender and to the receiver;
  outputting a waveform that comprises frequency signals from at least some individual ones of the plurality of globally, repulsively coupled oscillators, the generated waveform exhibiting chaotic behavior; and
  sending the waveform from the sender to the receiver,
  wherein each said oscillator has an associated uncoupled frequency.

31. The apparatus of claim 30, where the first key information comprises initial conditions that comprise at least one of an excitation pattern, used subsets of frequencies, and a set of observation intervals.

32. The apparatus as in claim 30, where first key information descriptive of said initial conditions is known to the receiver.

33. The apparatus of claim 30, where the second key information comprises a set of frequencies and a coupling matrix.

34. The apparatus of claim 30, where said second key information comprises strength of a feedback signal.

35. The apparatus as in claim 30, further comprising embedding at least one pilot signal into the generated waveform.

36. The apparatus of claim 30, wherein the apparatus generates a time evolution of frequencies output from at least some of the plurality of oscillators.

37. An apparatus comprising at least one processor and at least one memory including computer program code; the at least one memory and the computer program code configured, with the at least one processor, to cause the apparatus to perform at least the following:
  receiving a waveform from a sender at a receiver;
  exciting at least some individual ones of a plurality of globally, repulsively coupled oscillators with a signal comprising first key information known to the sender and to the receiver, and said array of globally, repulsively coupled oscillators representing second key information known to the sender and to the receiver;

outputting a waveform that comprises frequency signals from at least some individual ones of the plurality of repulsively coupled oscillators, the generated waveform exhibiting chaotic behavior; and comparing the output waveform to the received waveform, wherein each said oscillator has an associated uncoupled frequency.

38. The apparatus of claim 37, where, if a result of comparing indicates a difference between the generated waveform and the received waveform that is less than a threshold amount, indicating that the sender is an authorized sender.

39. The apparatus as in claim 37, where the first key information comprises initial conditions that comprise at least one of an excitation pattern, used subsets of frequencies, and a set of observation intervals.

40. The apparatus as in claim 37, further comprising means for detecting a presence of a pilot signal that is embedded in the received waveform.

41. The apparatus of claim 37, wherein the apparatus generates a time evolution of frequencies output from at least some of the plurality of oscillators.

* * * * *